United States Patent [19]

Miyaji et al.

[11] 4,314,272
[45] Feb. 2, 1982

[54] ADJUSTING DEVICE FOR COLOR TELEVISION CAMERA APPARATUS

[75] Inventors: Yoshimori Miyaji, Tokyo; Hirokazu Fujiki, Asakusabashi; Fumio Takahashi, Inagi, all of Japan

[73] Assignee: Tokyo Shibaura Denki Kabushiki Kaisha, Japan

[21] Appl. No.: 138,557

[22] Filed: Apr. 8, 1980

[30] Foreign Application Priority Data

Apr. 9, 1979 [JP] Japan .................................. 54/42822

[51] Int. Cl.³ ............................................. H04N 9/62
[52] U.S. Cl. ........................................ 358/10; 358/51
[58] Field of Search .............................. 358/10, 21, 51

[56] References Cited

U.S. PATENT DOCUMENTS 3,764,735 10/1973 Dieter-Schneider .................. 358/51
4,133,003 1/1979 Flory et al. ........................... 358/51

Primary Examiner—Richard Murray
Attorney, Agent, or Firm—Finnegan, Henderson, Farabow, Garrett & Dunner

[57] ABSTRACT

Disclosure is an adjusting device for a television camera apparatus which comprises a signal processing circuit for processing a video signal, a data detecting circuit for detecting an adjusting data from the processed video signal from the signal processing circuit, and an arithmetically operating circuit for calculating a correcting data from a reference data and the adjusting data from the data detecting circuit. The correcting data is converted by a correction signal circuit into an analog correction signal. This signal is supplied to the signal processing circuit and also to a deflection circuit. The adjusting device further comprises a data input means for manually inputting manual correcting data used to correct the adjustment errors inherently occurring in the television camera apparatus. The manual correcting data from the data input means is added to a reference data, whereby a manual adjusting data is determined. The manual correcting data is converted by the correction signal circuit into an adjusting signal which is supplied to, for example, the deflection circuit.

6 Claims, 4 Drawing Figures

ADJUSTING DEVICE FOR COLOR TELEVISION CAMERA APPARATUS

BACKGROUND OF THE INVENTION

This invention relates to a television camera apparatus, and more particularly to an adjusting device for use in a color television camera apparatus.

In a conventional color television camera apparatus, when an adjustment operation is performed, the adjustment which is called "routine adjustment" is automatically carried out by the use of an adjusting means built into the apparatus. In this type of adjustment a predetermined chart such as a registration chart is picked up by the camera apparatus, and the video signal from the camera corresponding to that predetermined chart is supplied to a signal processing section incorporated in the apparatus. In the signal processing section the video signal is subjected to gain control operation, gamma correction operation, pedestal level correction operation, conversion operation, etc. The video signal thus processed is supplied to a data detecting section. By this section adjusting data is detected from the video signal. The adjusting data is supplied to an arithmetic operation section. By this section, correcting data is calculated from the adjusting data and reference data previously stored in a memory section. The correcting data is converted by a correcting signal circuit into an analog correcting signal and then is supplied into a deflecting circuit and a signal processing circuit. Further, the correcting data is stored in the memory section as a new reference data.

The above-mentioned adjusting operation is called "reference adjustment", which adjusts electrically the main part of the color television camera apparatus. Since the component parts constituting the apparatus do not always have uniform or equal electric characteristics, adjustment errors peculiar to the apparatus are made, failing to accomplish a complete adjustment of the apparatus if by such "reference adjustment" only. Further, where the television camera is directed toward a specified foreground subject, for instance where it is operated, in a relay broadcasting of a baseball game, in a manner that it is directed mainly to the pitcher and catcher, it should preferably be closely adjusted so as to obtain a good picture of such subjects.

SUMMARY OF THE INVENTION

Accordingly, the object of the invention is to provide an adjusting device for a color television camera apparatus which is capable of making the above-mentioned "reference adjustment" as well as of correcting the peculiar errors in adjustment which are made in the apparatus.

According to the invention, the adjusting device for color television camera apparatus is provided with a signal processing section for processing the video signal corresponding to a predetermined chart such as a registration chart, a data detecting section for detecting the adjusting data from the video signal thus processed, and an arithmetic operation section for calculating correcting data from the adjusting data supplied thereto from the data detecting section, and from the reference data previously stored in a memory section. The adjusting device is further provided with a data input section for having manually inputted thereto the adjusting data peculiar to the camera apparatus.

In a camera apparatus having an adjusting device built therein, when the routine "reference adjustment" is carried out, correcting data is calculated from the adjusting data from the data detecting section and the reference data stored in the memory section. When adjustment is carried out on the basis of the manual correcting data from the data input section, the data detecting section is electrically disconnected from the arithmetic operation section, whereby correcting data is calculated on the basis of the reference data and the manual correcting data from the data input section.

DETAILED DESCRIPTION OF THE PREFERRED EMBODIMENT

Figure 1:
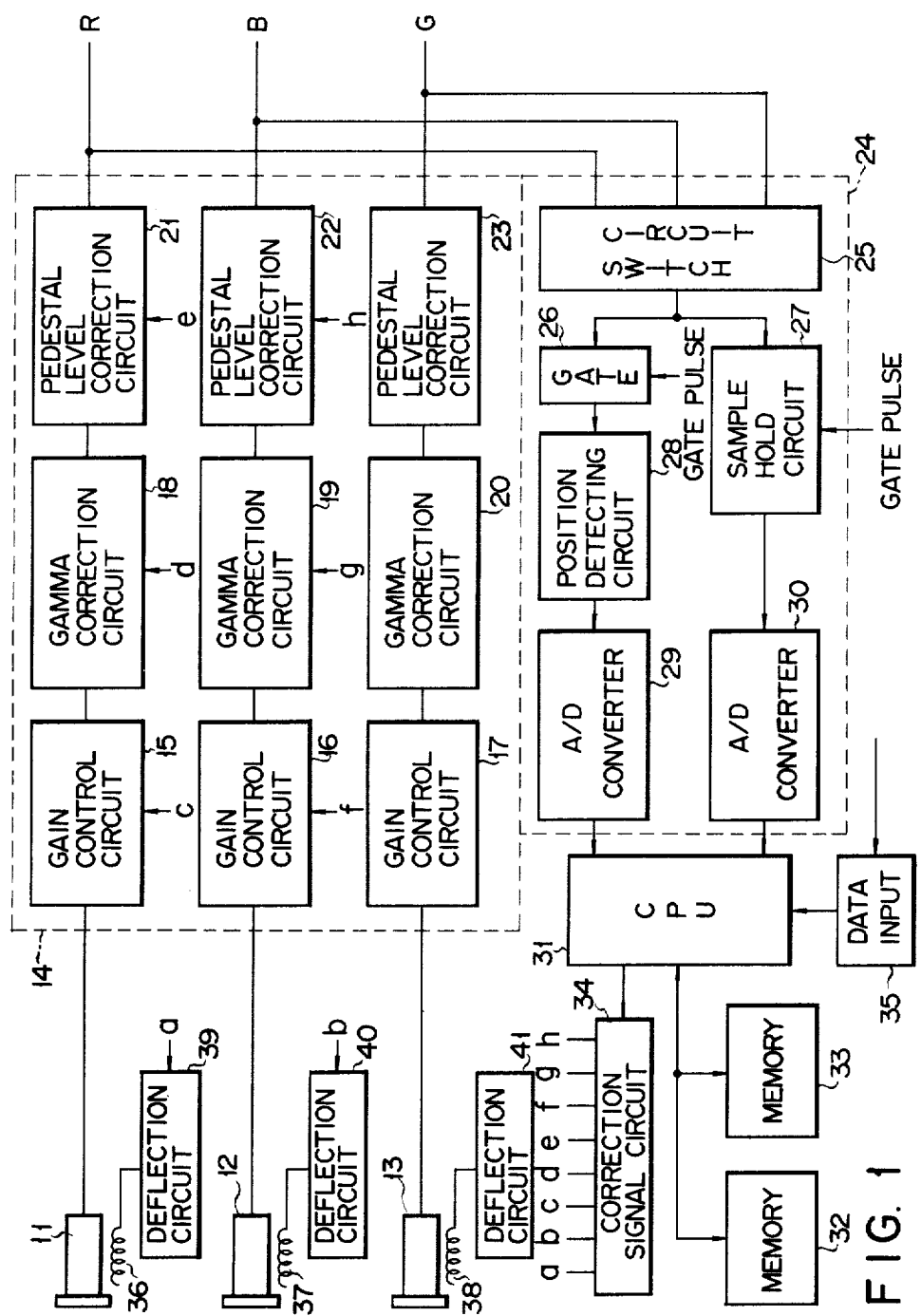
FIG. 1 is a circuit diagram showing an adjusting device for a color television camera apparatus in accordance with an embodiment of the invention.

Referring to FIG. 1, the outputs of red, blue and green color television tubes 11, 12 and 13 are connected, respectively, to the input terminals of gain control circuits 15, 16 and 17 provided in a signal processing section 14. The output terminals of the gain control circuits 15, 16 and 17 are connected, respectively, to the input terminals of gamma correction circuits 18, 19 and 20. The output terminals of the gamma correction circuits 18, 19 and 20 are connected, respectively, to the input terminals of pedestal level correction circuits 21, 22 and 23. The output terminals of the pedestal level correction circuits 21, 22 and 23 are connected, respectively, to the input terminals R, B and G of a switch circuit 25 provided in a data detecting section 24. The output terminal of the switch circuit 25 is connected to the input terminal of a gate circuit 26 and to the input terminal of a sample hold circuit 26. The output terminal of the gate circuit 26 is connected to the input terminal of a position detecting circuit 28. The output terminals of the position detecting circuit 28 and sample hold circuit 27 are connected, respectively, to an arithmetic operation section, for example, CPU 31, via A-D converters 29 and 30. To CPU 31 are connected memories 32 and 33, correction signal circuit 34 including a D-A converter and a data input device 35. Deflection circuits 39, 40 and 41 are connected to the deflection coils 36, 37 and 38 of the television camera tubes 11, 12 and 13, respectively.

Figure 2:
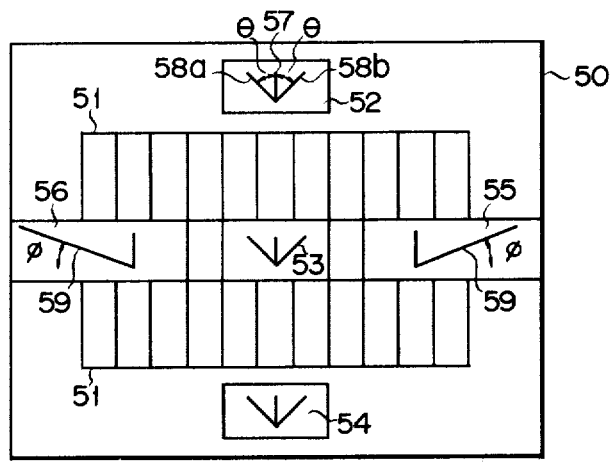
FIG. 2 is a test chart.

When, in the above-mentioned circuit construction, a test chart 50 as shown in FIG. 2 is picked up by the television camera tubes 11, 12 and 13, the video signals corresponding to the pattern of the test chart 50 are outputted from the camera tubes 11, 12 and 13. The test chart is provided with gray scale 51, substantially V-shaped reference markers 52, 53 and 54, and rotation detection markers 55 and 56. The reference markers 52, 53 and 54 each have a pair of lines 58a, 58b which are each inclined at an angle of $\theta = 45°$ with respect to a central axis 57. Each of the rotation detection markers 55 and 56 has a line 59 which is inclined at an angle of less than $\theta = 45°$ with respect to the horizontal line.

Figure 3:
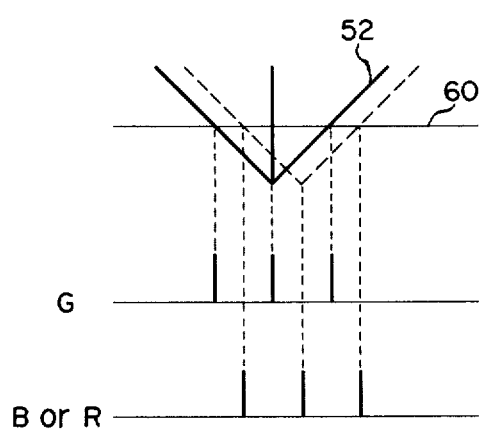
FIG. 3 is the waveform of a marker signal which corresponds to a rotation marker.

When supplied to the signal processing section 14, the three color video signals corresponding to the pattern of the test chart 50 having such markers as shown in FIG. 2 are subjected, by the gain control circuit, gamma correction circuit and pedestal level correction circuit involved in the section 14, to gain control, gamma correction and pedestal level correction, respectively. The three color video signals, R, B and G, which have passed through the signal processing section 14 are inputted to the three input terminals of the switch circuit 25 of the data detecting section 24. By this switch circuit 25 the G video signal is supplied to the gate circuit 26 and to the sample hold circuit 27. The gate circuit 26, in response to a gate pulse, supplies the G video signal to the position detecting circuit 28. From the marker pulse for the G video signal the marker position is detected by position detecting circuit 28. In this case, detection of the marker position is made by the marker pulse G which, as shown in FIG. 3, is generated when a scanning line 60 has passed through the marker 52. The detection signal thus obtained is converted by the A-D converter 29 into a digital signal and is stored, as G marker data, in the memory 32.

Figure 4:
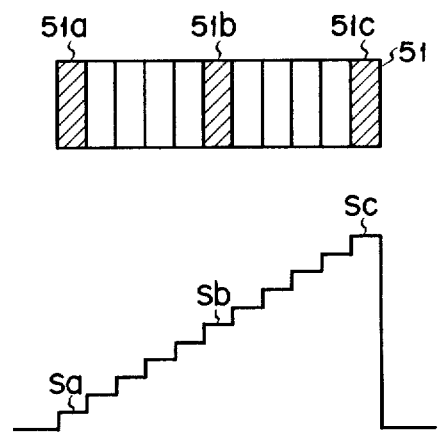
FIG. 4 is the waveform of a gray scale signal which corresponds to a gray scale.

In the sample hold circuit 27, the green scale signals Sa, Sb and Sc corresponding to the regions 51a, 51b and 51c of the gray scale 51 shown in FIG. 4 are picked up, in response to the gate pulse, from the G video signal and then are converted by the A-D converter 30 into a digital signal and are then stored, as G gray data, in the memory 32.

Next, when the B video signal is supplied from the switch circuit 25 to the gate circuit 26 and also to the sample hold circuit 27, the marker pulse B and the gray scale signals Sa, Sb and Sc are obtained in the same manner as in the case of G video signal. The marker pulse B is converted by the A-D converter 29 into a digital B marker data. This B marker data and the G marker data of the memory 32 are compared with each other by CPU 31, whereby the difference between the B and G marker data is detected. In accordance with that difference, a feed back signal b is supplied from the correction signal circuit 34 to the deflection circuit 40 of the blue television camera tube 12, whereby the B deflection signal is allowed to coincide with the G deflection signal, i.e., a proper registration is attained.

The gray scale sampling signals Sa, Sb and Sc of the B video signal is converted by the converter 30 into B gray scale data. This B gray scale data is compared by CPU 31 with the G gray scale data. In accordance with the difference between the B and G gray scale data, a gain control signal f, gamma correction signal g and pedestal level correction signal h are outputted from the correction signal circuit 34 and are respectively supplied to their corresponding circuits 16, 19 and 22. In the same manner as above stated, the position detection of the marker is made in accordance with the R video signal and the sampling of the gray scale signal is also carried out. The marker pulse which is obtained from the position detection is converted into a digital R marker data, while the sampled signals which are obtained by sampling are converted into R gray scale data. The R marker data is compared with the G marker data whereby the difference between both is determined, while the R gray scale data are compared with the G gray scale data whereby the difference between both is determined. The correction signals a, c, d and e corresponding to such differences are supplied from the correction signal circuit 34 to the corresponding circuit 39, 15, 18 and 21, respectively.

In the same manner as stated above, the B marker data and B gray scale data are compared, respectively, with the G marker data and G gray scale data, whereby the differences between the respective two are determined by CPU 31. From such differences the correcting values are calculated. The correcting data corresponding to the correcting values thus obtained is stored, as new reference data, in the memory 32. By the position detection signal the data on the centering, size, linearity, rotation registration, etc. are detected, while by the gray scale signal the data on the gamma, pedestal, gain, etc. are detected. The centering is performed on the basis of data of the marker 53. The adjustment of the vertical size is carried out on data of the markers 52 and 54 while the adjustment of the horizontal size on data of the markers 55 and 56. The adjustment of the vertical linearity is performed on data of the markers 52, 53 and 54. The adjustment of the horizontal linearity is carried out on data of the markers 55, 53 and 56. The correction of the rotation uses data of the markers 55 and 56. The gray scale signals Sa, Sb and Sc are used for adjustments of the pedestal level, gamma and gain, respectively.

The above-mentioned adjusting operation is a routine "reference adjustment". Reference will now be made to the manual correction as to the adjustment for errors which are peculiar to or inherent in the television camera apparatus. In the manual correction, the adjusting signal which is obtained by controlling a pedestal adjuster or registration adjuster provided in a television camera control unit or color television camera head is supplied to the data input device 35. The adjusting signal is converted by the data input device 35 into a digital signal and then is supplied to the memory 33 via CPU 31 and is stored therein as a manual correcting data. This manual correcting data is necessary to correct the registration, linearity, etc., for example, at the upper or lower portion of the picture screen. The manual correcting data is stored in the memory 33 while keeping the data detecting section 24 electrically disconnected and having such correcting data monitored by a waveform monitor. The manual correcting data is added to the reference data stored in the memory 32 and the resulting data is converted by the correction signal circuit 34 into a correction signal. This correction signal is supplied to the deflection circuit 39 or 40, whereby a desired manual correction on the deflection operation is carried out. Thereafter, the data detecting section 24 is reconnected to CPU 31, whereby the above-mentioned reference adjustment is performed on the basis of the reference data stored in the memory 32. The adjustment errors peculiar to the television camera apparatus is corrected as above in accordance with the manual correcting data. This manual correcting data is not required to be inputted each time the manual correction is needed. For instance, if the use of the television camera apparatus remains unchanged, the total adjustment and correcting operation for the television camera apparatus is automatically carried out if the manual correcting data stored in the memory 33 is supplied to CPU 31 together with the reference data in the memory 32.

In the above-mentioned embodiment, the data detecting section 24, CPU 31, correction signal circuit 17, memories 32 and 33 and data input device 35 are provided within the television camera control unit. Those components may be provided within the camera head. Further, the two memories 22 and 33 according to the above embodiment can be constituted by a nonvolatile Random Access Memory, whereby both the reference data and the manual correcting data are stored in one memory to permit CPU to control the data reading and writing operation.

According to the invention, since CPU 31 is supplied with the manual correcting data from the data input device, it is possible to correct, in accordance with the purpose of the color television camera apparatus, the adjusting errors peculiar to it which occur due to the non-uniformities of, for example, characteristics of the circuit components other than those used for the reference adjustment.

What we claim is:

1. An adjusting device for a television camera apparatus which comprises:
   (a) a signal processing section for processing video signals which correspond to the pattern of a test chart and which contain adjusting data,
   (b) a data detecting section for detecting the adjusting data from said video signals which are supplied from said signal processing section,
   (c) an arithmetic operation section for calculating correcting data from reference data and said adjusting data detected by said data detecting section,
   (d) a correction signal circuit for converting the correcting data calculated by said arithmetic operation section into a correcting signal and supplying said correcting signal to said signal processing section and also to a deflection circuit,
   (e) a manual correcting data generating means for manually issuing manual correcting data used to correct adjustment errors occurring inherently in said television camera apparatus, and
   (f) a memory section for storing said manual correcting data and also storing either one of said reference data and said calculated correcting data as reference data,
   whereby said arithmetic operation section adds said manual correcting data to said reference data to provide adjusting data.

2. An adjusting device according to claim 1, wherein said video signals are a Red (R) video signal, Blue (B) video signal and Green (G) video signal; and said data detecting section includes means for detecting adjusting data from said R, B and G video signals.

3. An adjusting device according to claim 1, wherein said arithmetic operation section which, at the time of adding said manual correcting data from said memory section to said reference data, is constructed so that said data detecting section may be disconnected from said arithmetic operation section.

4. An adjusting device for a television camera apparatus which comprises:
   (a) a signal processing section for processing Red (R), Blue (B) and Green (G) video signals which indicate a test pattern having a gray scale, reference marker and rotation detection marker,
   (b) a data detecting section for receiving video signals from said signal processing section and detecting gray scale data and marker data,
   (c) an arithmetic operation section for calculating correcting data from said gray scale data and marker data detected by said data detecting section and reference data including reference gray scale data and reference marker data,
   (d) a correcting signal circuit for converting said correcting data calculated by said arithmetic operation section into a correcting signal and suppling said correcting signal to said signal processing section and a deflection circuit,
   (e) a manual correcting data generating means for manually issuing manual correcting data used to correct adjustment errors inherently occurring in said television camera apparatus, and
   (f) a memory section for storing said manual correcting data and either one of said reference data and said calculated correcting data as reference data, whereby said arithmetic operation section adds said manual correcting data to said reference data to provide adjusting data.

5. An adjusting device according to claim 4, wherein said data detecting section first detects G gray scale data and marker data from said G video signal and then detects B and R gray scale data and marker data from said B and R video signals, respectively, and said arithmetic operation section causes said G gray scale data and marker data to be stored as reference data in said memory section and detects the difference between said B and R gray scale data and marker data and said G gray scale data and marker data to determine correcting data.

6. An adjusting device according to claim 4, wherein said manual correcting data generating means includes means for supplying to said memory section, via said arithmetic operation section, an adjusting signal caused generate by adjusting an adjusting member provided in a television control unit of said television camera apparatus.

* * * * *